United States Patent Office 2,725,347
Patented Nov. 29, 1955

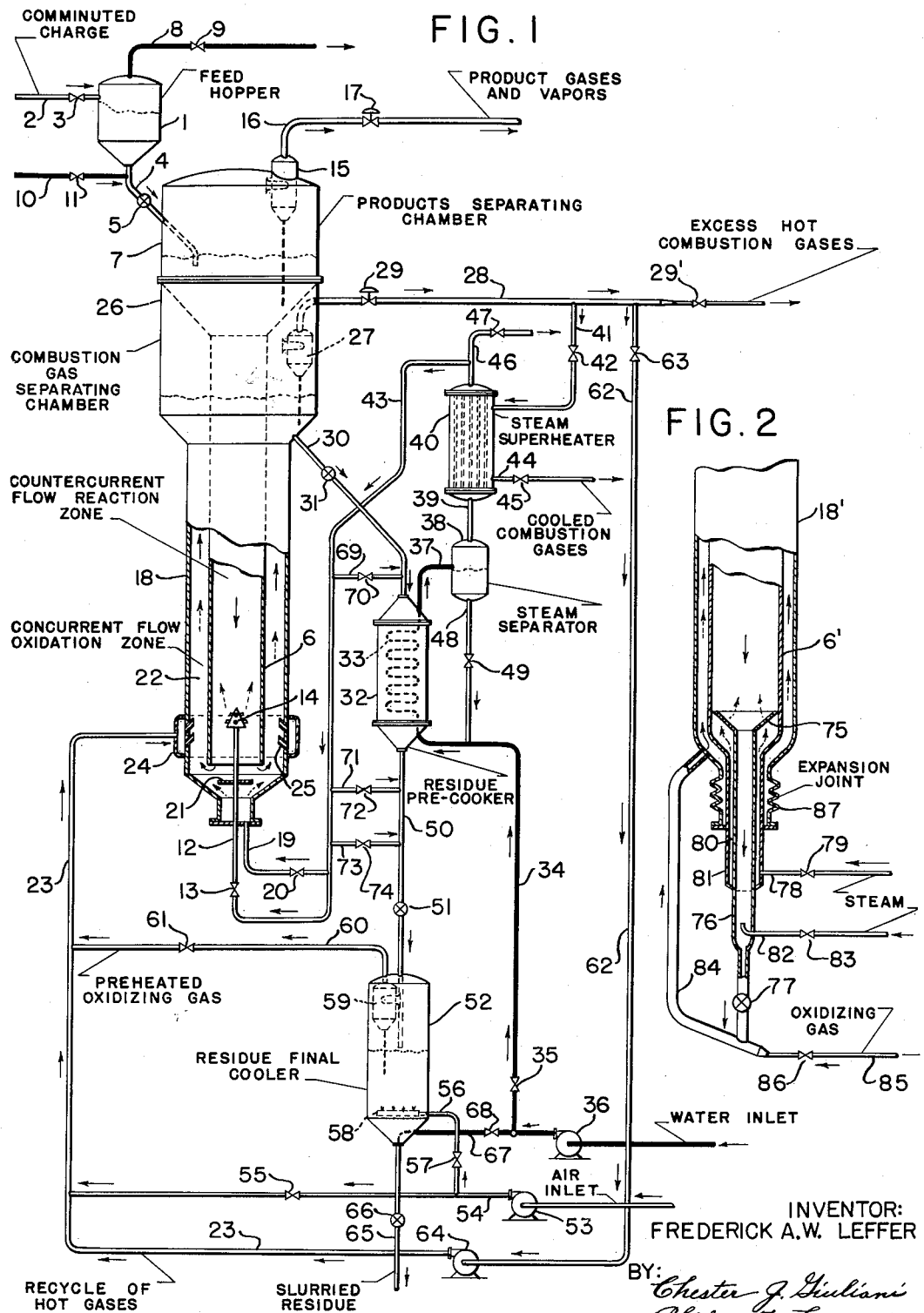

2,725,347

PROCESS AND APPARATUS FOR DISTILLING SOLID CARBONACEOUS MATERIALS

Frederick A. W. Leffer, Riverside, Ill., assignor to Universal Oil Products Company, Chicago, Ill., a corporation of Delaware Application August 29, 1952, Serial No. 307,146

8 Claims. (Cl. 202—6)

This invention relates to a process and apparatus for treating solid carbonaceous materials, and more specifically for producing fluid products from oil shale, coal, torbanite, and the like hydrocarbonaceous solids in a continuous fluidized type of operation.

There are, of course, various fluidized and continuously moving bed types of operations for effecting the distillation of oil shale and other solid hydrocarbonaceous materials. However, the present processing operation provides material improvements in effecting the contacting of the subdivided solid charge, as well as residues thereof, with gaseous reactants and processing fluids, and it also provides for an improved apparatus arrangement especially adapted for effecting the distillation or partial gasification of hydrocarbonaceous solids with improved thermal efficiency.

Thus, it is a principal feature of the present invention to provide a processing flow utilizing novel steps for successively contacting the subdivided solid carbonaceous material in an efficient manner and in a novel compact apparatus arrangement.

In a broad aspect, the present process permits producing desirable fluid products from comminuted solid carbonaceous material in a manner which comprises, continuously subjecting the material in a confined reaction zone to an endothermic reaction in contact with a gaseous fluid and producing thereby a gasiform product stream and a carbon-containing particulated residue, continuously supplying the latter residue to a confined oxidation zone and therein reacting carbon of the residue exothermically with an oxidizing gas, continuously discharging gaseous oxidation products and heated residual particles from the oxidation zone, passing a stream of the heated residual particles through a heat exchange zone in indirect heat exchange relationship with a cool non-oxidizing fluid and thereby preheating the latter, passing a stream of the resulting preheated non-oxidizing fluid into indirect heat exchange with a stream of the hot gaseous oxidation products being discharged from the oxidation zone and thereby transforming the preheated non-oxidizing fluid into a superheated gasiform fluid, introducing a stream of the superheated fluid as at least a part of said gaseous fluid passing into the reaction zone and into contact with the comminuted carbonaceous particles therein, passing partially cooled residual particles from the heat exchange zone into a residue cooling zone and therein contacting them with a free oxygen containing gas to heat the latter, and passing the resulting heated oxygen-containing gas from the residue cooling zone to the oxidation zone as at least a part of said oxidizing gas.

In a preferable arrangement and operation, the comminuted charge is introduced into the reaction zone by gravity flow and a subsequent gravity flow is maintained between superimposed heat exchange and residue cooling zones so that the need of mechanical conveying apparatus is obviated. In the present improved operation fluidized contacting of the particles is maintained within both the endothermic reaction zone and the exothermic oxidation zone, so that there is uniform contacting and a maximum efficiency in producing gasiform product streams. The fluidized flow within the reaction and oxidation zones may be maintained by either concurrent or countercurrent contact of the reactant stream with respect to the general flow of solid particles, however, inasmuch as it is desirable to maintain the two zones in a close compact arrangement, a preferred embodiment maintains a concurrent flow of both the gaseous reactant medium and the solid particles in one zone and a countercurrent flow between a rising gaseous stream and descending particles in the other zone.

It is a further feature of the present invention to have the endothermic and exothermic reaction zones in indirect heat exchange relationship with another so that excess heat from the oxidation zone may be utilized within the endothermic reaction zone and improve the overall thermal efficiency of the operation. Various types of gasiform heating streams may be utilized within the reaction zone, however, preferably, an aqueous fluid is utilized to effect the cooling of the residue particles and resulting steam is superheated by hot gaseous combustion products of the process in the heat exchange zone to provide the high temperature gasiform medium effecting the distillation or other endothermic treatment of the fresh comminuted charge.

Still another feature of the invention is the heating of at least a part of the oxidizing gas stream by direct contact with hot residual particles in the cooling zone of the system so that pre-heated oxidizing gas is introduced into the oxidation zone and an increased thermal efficiency is attained.

Thus, in a more specific embodiment, the present invention provides a method for contacting subdivided solid hydrocarbonaceous material in a manner which comprises continuously passing a column of the material downwardly through a confined vertically elongated conversion zone in countercurrent contact with a stream of high temperature steam and subjecting the material to endothermic conversion with the formation of desirable gasiform conversion products and carbon-containing residual particles, passing resulting carbonized particles in a confined elongated combustion zone and into concurrent fluidized contact with an oxidizing gas stream therein and burning carbon from said carbonized particles in the combustion zone, continuously discharging hot combustion gases and heated particulated residue from the combustion zone, passing the discharged residue downwardly through a heat exchange zone and into contact with an aqueous fluid in indirect heat exchange relationship therewith and thereby producing low temperature steam, passing a stream of the low temperature steam into indirect heat exchange with a stream of hot combustion gas being discharged from said combustion zone and thereby producing super-heated steam as said stream of high temperature steam being introduced into the conversion zone, passing partially cooled residue continuously from the heat exchange zone into a confined residue cooling zone and therein contacting the latter with a free oxygen-containing gas, and passing a heated oxygen-containing gas stream from the cooling zone to the oxidation zone as at least a part of the stream effecting the concurrent fluidized contact with said carbonized particles.

Preferably, both the reaction zone and the oxidation zone are elongated tubular chambers with one zone being positioned concentrically within the other so that there is a desired indirect heat exchange relationship between zones and such that there may be substantially direct communication between the lower ends of each of the zones permitting a reversal in flow of the particulated material. Thus, for example, there may be descending flow to the solid particles countercurrent to gasiform fluid within an inner reaction zone and concurrent upward flow of the solid particles and gasiform contacting stream within an external annular-shaped oxidation zone.

The construction and arrangement of the improved processing unit, as well as modifications in connection therewith, and the improved efficient processing flow, may be better shown by reference to the accompanying drawing and the following description thereof.

Figure 1 of the drawing is a diagrammatic elevational view of a processing unit for effecting the treatment of an oil shale, coal or other carbonaceous material.

Figure 2 of the drawing indicates diagrammatically and in cross-section the lower portion of the reaction and oxidation zones of a compact tubular unit, so as to illustrate a modification of the means for transferring particles from one zone to the other.

Referring now to Figure 1 of the drawing, there is shown an upper feed hopper 1 which is suitable to receive and store comminuted carbonaceous charge material by way of line 2 and valve 3. For illustrative purposes, it will be assumed that subdivided particles of oil shale are introduced into the present feed hopper 1 and into the processing unit being described in connection with the present invention, whereby the oil shale may be distilled and converted to produce more valuable gaseous and liquid products. The charge material passes from the hopper 1 by way of conduit 4 and feeder valve 5 into the upper portion of an elongated tubular reaction chamber 6. However, the particles first pass into an enlarged cross-sectional area separating chamber 7, which is suitable for separating product gases and vapors from the descending column of solids as will hereinafter be set forth. The present embodiment provides a vent line 8 and valve 9 connecting with the upper portion of said hopper 1, as well as an aerating line 10 and control valve 11 connecting with the particle outlet conduit 4.

The comminuted shale particles pass downwardly through the reaction chamber 6 in a continuously descending fluidized column, countercurrently to a high temperature gasiform heating and distilling medium which is introduced into the lower portion of chamber 6 by way of a line 12, control valve 13 and a distributing header 14. Again, it will be assumed in connection with the present description, that high temperature heated steam is being introduced by way of distributor 14 as the gasiform distilling medium, and at a temperature suitable to remove all of the desired volatalizable components from the oil shale. The velocity and quantity of superheated steam being introduced to the distillation and reaction chamber 6 may of course vary in accordance with the degree of fluidization desired as well as correlated with the quantity and size of particles descending in the fluidized column. However, it is a feature of the present invention to utilize a relatively small cross-sectional chamber having a height at least 10 times that of the diameter of the chamber whereby there is provided a relatively long contact period with the particles and in addition, uniform, efficient contacting by virtue of the countercurrent fluidized flow. Resulting distillation products, together with excess steam, are separated from the descending column of shale particles in the upper separation chamber 7 and pass outwardly through a separation device, such as the centrifugal separator 15, and conduit 16 containing control valve 17. The cross-sectional area of the chamber 7 is of sufficient diameter to permit lateral expansion of gases and vapors from the reaction zone and thus more readily disengage the gasiform distillation products from the particles. Preferably, the separating zone that is provided by chamber 7 has a cross-sectional area at least 7 times as large as that of the tubular reaction zone 6.

The distilled shale particles leave the lower end of the reaction chamber 6 in a continuously moving descending column and then reverse their direction of flow, passing upwardly in the present embodiment as an outer annular fluidized column within the external tubular chamber 18. The reversal in the direction of flow of the distilled shale particles is effected by the introduction of aerating and oxidizing gas streams introduced at the lower end of chamber 18. Steam or other aerating medium is introduced through line 19 and valve 20 into the lower end of the chamber 18 and around the steam inlet line 12, while suitable baffling means 21 aid in directing the flow of the aerating gas circumferentially upwardly into the lower end of the annular zone between chambers 6 and 18, which in turn define an oxidation zone 22. An oxidizing gas stream is also introduced to the lower end of the oxidation zone 22 by means of line 23 and a distributing header 24, which in turn may be provided with suitable orifices or nozzle means 25 for injecting the oxidizing gas circumferentially upwardly into the oxidation zone. The carbonaceous material and coke on the distilled particles is substantially completely burned in zone 22 by the oxidizing gas stream introduced by way of line 23, while the particles pass concurrently upwardly with the gasiform medium in an annular shaped fluidized column.

It is to be noted that this arrangement provides an exothermic oxidation zone around and in indirect heat exchange relationship with a major portion of the elongated inner tubular reaction zone, so that additional distilling heat may be imparted to the particles as they descend through the inner chamber 6, and there is a resulting high thermal efficiency. The free cross-sectional area of the reaction zone 6 ordinarily is about equal to or slightly larger than that of the oxidation zone 22, although the ratio of these cross-sectional areas may vary within wide limits such as from 2:1 to 1:2 depending on the particular operation being performed. The upper end of the external chamber 18 connects with an enlarged area separating chamber 26, which in turn is in alignment with the upper product separating chamber 7. The lower conical bottom of chamber 7 forms the upper closure of chamber 26 and seals these two chambers from each other. Within separating chamber 26, the gasiform combustion gases are disengaged from the ascending column of resulting burned and heated shale particles. Here again, the size or cross-sectional area of chamber 26 is constructed in a manner to have a substantially larger area than that of the ascending annular column of particles, whereby there is a lateral expansion of the gasiform combustion products and an efficient separation thereof from the particles. Preferably, the free cross-sectional area of the separation chamber 26 is at least nine times as large as that of the tubular oxidation zone 22. The hot combustion gases pass outwardly from chamber 26 by way of a particle separator 27, conduit 28 and control valve 29. Combustion gases not desired for further use within the system may be discharged by way of valve 29.

The resulting burned high temperature particles reaching the separating chamber 26 are continuously discharged therefrom by way of conduit 30 and flow control means 31 which in turn communicate with the upper portion of a residue pre-cooling chamber 32. The high temperature particles pass in indirect heat exchange relationship with coil means 33 which accommodates a fluid stream, such as water, which in turn is introduced by way of line 34, valve 35 and pump 36. This heat exchange effects a partial cooling of the residual shale particles and generation of low temperature steam. This steam passes from column 33 by way of line 37 and into a steam separating zone 38 from which steam is discharged by way of line 39 into a steam superheating chamber 40. In this superheating chamber 40, the low temperature steam passes into heat exchange relationship with high temperature combustion gases being discharged from line 28 by way of line 41 and valve 42. Resulting superheated steam passes from chamber 40 by way of line 43 while cooled combustion gases pass from the superheater by way of line 44 and valve 45. Excess superheated steam may be discharged from line 43 by way of the line 46 and valve 47.

In accordance with the operation of the present invention, high temperature gasiform medium, exemplified by superheated steam as provided by indirect heat exchange with both the resulting distilled solid particles and the hot combustion gases, is utilized as the distilling medium being introduced into the distilling and reaction chamber 6. Thus, line 43 connects directly with line 12 and distributing header 14 which introduces the superheated steam into the lower end of reaction chamber 6 for the countercurrent contact with the descending comminuted oil shale. Line 43 also communicates with the line 19 so as to provide high temperature superheated steam as the aerating medium being distributed into the lower end of the annular oxidation zone 22. Water which is collected in the steam separating zone 38 is discharged from the lower end of the latter chamber by way of line 48 and valve 49, and as indicated in the present drawing may connect with water inlet line 34 to be recycled to the residue cooler 32 and steam coil 33.

The partially cooled shale residue passes downwardly from pre-cooling chamber 32 by way of conduit or standpipe 50 and flow control means 51 and into the upper portion of a final cooler 52. In the final cooler 52, a gaseous oxygen containing stream, indicated in the present drawing as air, is introduced into the lower end thereof in order to pass upwardly countercurrently to the residue. A compressor or blower 53 discharges air through line 54 and valve 55, and at least a portion of this air stream passes by way of line 56 and valve 57 into a distributing header 58 positioned within the lower portion of cooler 52. Thus, a heated oxygen-containing stream passes from cooler 52 by way of separator 59 and line 60 having control valve 61 into the oxidizing gas inlet line 23. Line 54 and valve 55 from the air compressor 53 also connects with inlet line 23, however, in accordance with a particular feature of the present invention at least a portion of the oxidizing gas stream is preheated by contact with the heated shale residue and is introduced into the oxidizing zone.

As still another feature of the present high efficiency thermal operation, excess high temperature combustion gases from line 28, are recycled by way of line 62, valve 63, and recycle pump 64, which in turn connect with line 23. Thus, the oxygen content and temperature of the oxidizing stream introduced into the lower end of the annular shaped oxidation zone 22 may be regulated and controlled by the proportioning of different amounts of gasiform medium from air lines 60 and 54, and hot gas recycle line 62.

The cooled residue from chamber 52 is preferably discharged from the lower end of the latter zone in a slurry stream by way of line 65 and valve 66, with water being introduced into the lower end of the chamber by way of line 67 and valve 68 which in turn communicate with the water inlet line 35. A preferred arrangement of the cooling zones is a vertical alignment substantially as indicated diagrammatically in the drawing so that the distilled and oxidized shale residue may pass from the upper portion of the oxidation zone and the separating chamber 26 by gravity flow and as a relatively compact fluidized mass. Aeration may be provided to the descending columns of residue by small streams of superheated steam. A line 69 and valve 70 permits passing steam from line 43 into conduit 30 above the residue pre-cooler 32. Also, a line 71 and valve 72 and line 73 with valve 74 provide means for introducing aerating steam into the transfer conduit 50.

In carrying out the present process, the temperature for distillation in the distilling chamber 6 will depend largely on the initial composition of the solids charge material, but in any event it should be sufficient to carbonize tar components of the solid particles so as to permit the distillation residue to remain in a finely divided state for fluidized contacting and transfer between succeeding zones. Normally, the gasiform distilling medium introduced into the lower portion of the distilling chamber 6 is at a temperature of at least about 900° F. and preferably at 1000° F. or more. The process may be operted under any suitable pressure but normally will be carried out at atmospheric or superatmospheric up to about 10 atmospheres. The pressures in the reaction and oxidation zones of the present unit will be substantially the same, except for the pressure differential which assures the maintenance of fluidized contacting in each zone. The pressures in the superimposed cooling zones may of course be somewhat different from that maintained in the coextensive fluidized contacting chambers.

A selection of the fineness of the particles charged to the unit may vary, however, it is a particular advantage, as provided by this invention, to maintain a solid material in a continuous freely flowing state so that the material may be fluidized and readily transferred from one zone to another. Providing finely divided particles increases the rate and uniformity of disengagement of volatile organic compounds from the solid with a resultant increase in the rate of distillation or cracking. The comminuted state also increases the rate and completeness of combustion of the combustible components in the distillation residue. Still further, a comminuted state facilitates the removal and handling of residue particles permitting such residue to be removed in a slurry stream. Inasmuch as it is desired to effect the contacting of the shale particles in fluidized beds with gasiform reactant streams in each of the different contacting zones, it is preferable that the particle size be less than about 1 mm., say within the approximate range of from about 0.1 to about 0.8 mm. diameter.

Referring now to Figure 2 of the drawing, there is shown a modified construction at the lower end of both the distilling and oxidation zones, the outer oxidation chamber being indicate as 18' and the inner reaction chamber being indicated as 6'. The descending fluidized column of distilled shale particles pass from the lower end of 6' through the center portion of a conically shaped perforate section 75 and continue through an elongated outlet conduit 76 having control valve or feeding means 77. The high temperature distilling medium which is introduced into the lower end of chamber 6', in order to countercurrently contact the descending column of particles, first enters the unit by means of a line 78 and valve 79 and an annular passageway 80, which is defined by inner conduit 76 and a lower extension 81 of the chamber 6'. This distilling medium passes through the perforations of conical section 75 into the lower end of chamber 6'. Stripping steam is also indicated as being introduced into the lower end of transfer conduit 76 by means of a line 82 and valve 83.

The distilled shale particles from conduit 76 are introduced into a riser line 84 which in turn communicates directly with the lower portion of chamber 18' and the lower portion of the annular shaped oxidation zone. An oxidizing gas stream is introduced into the riser line 84 by way of line 85 and valve 86, thus the oxidizing gas stream carries the distilled particles upwardly through riser 84 and through the annular shaped oxidation zone in a concurrent fluidized flow. This arrangement obviates the necessity for a direct open communication between the distilling zone and the oxidation zone but is effective in providing the reversal in flow of the contacted particles from a fluidized countercurrent flow to a fluidized concurrent flow. It is to be noted that an expansion joint 87 connects the lower end of the chamber 18' with the lower extension of the inner chamber 81 and there is thus provided means for accommodating differential expansions in the two different contacting chambers as they are placed in operation under high temperature conditions.

It is of course to be understood that minor modifications in detail may be made in various portions of either Figure 1 or Figure 2 of the drawing. For example, other types of fluid distributing headers, or fluid inlet means, may be provided than are indicated in the present drawing. Also, other forms of shell and tube heat exchangers may be used, and it is not intended to limit their construction or arrangement to the forms shown in the drawing.

I claim as my invention:

1. A process for producing fluid products from comminuted solid carbonaceous material which comprises continuously passing a column of said material downwardly in countercurrent contact with a stream of gasiform fluid through a confined vertically elongated conversion zone and therein subjecting said material to endothermic conversion with formation of gasiform conversion products and carbon-containing residual particles, laterally expanding and upwardly disengaging said gasiform products from said column of material into a confined product separating zone in open communication with the upper end of said conversion zone and continuously removing a product stream from the upper portion of said product separating zone, reversing the direction of movement of said residual particles issuing from the lower end of the conversion zone and passing them upwardly through an oxidation zone as a dense mass annularly surrounding and in indirect heat exchange relation with a major portion of said conversion zone, subjecting the particles in the ascending dense mass to oxidation in concurrent contact with a stream of an oxidizing gas, laterally expanding and upwardly disengaging the resultant gaseous oxidation products from the resultant residual particulated dense mass into a confined gas separating zone in open communication with the upper end of said oxidation zone and surrounding an elevated minor portion of said conversion zone, and separately discharging a stream of said gaseous oxidation products from the upper portion and a stream of said residual dense mass from a lower portion of said gas separating zone.

2. A process for the treatment of of subdivided solid hydrocarbonaceous material which comprises continuously passing a column of said material downwardly at a carbonizing temperature in countercurrent contact with a stream of gasiform distilling medium through a vertically elongated distillation zone, laterally expanding and upwardly disengaging resultant gasiform distillation products and distilling medium from the descending column into a confined vapor separating zone in open communication with the upper end of said distillation zone and continuously removing them from the upper portion of said vapor separating zone, reversing the direction of movement of the carbonized solid particles issuing from the lower end of said distillation zone and passing them upwardly through a combustion zone as an ascending dense mass annularly surrounding and in indirect heat exchange with a major portion of said distillation zone, subjecting the particles in said ascending dense mass to carbon combustion in concurrent contact with an oxidizing gas stream, laterally expanding and upwardly disengaging the resultant combustion gases from the residual particulated dense mass into a confined gas separating zone in open communication with the upper end of said combustion zone and surrounding an elevated minor portion of said distillation zone, and continuously discharging said combustion gases from the upper portion and said residual particulated dense mass from a lower portion of said gas separating zone.

3. A process for producing fluid products from comminuted solid carbonaceous material which comprises continuously passing a column of said material downwardly in countercurrent contact with a stream of high temperature superheated steam through a confined vertically elongated conversion zone and therein subjecting said material to distillation and endothermic conversion with formation of gasiform conversion products and carbon-containing residual particles, laterally expanding and upwardly disengaging said gasiform products from said descending column of solid material into a confined product separating zone in open communication with the upper portion of said conversion zone and continuously discharging a product stream from the upper portion of said product separating zone, reversing the direction of movement of said residual particles issuing from the lower end of the conversion zone and passing them upwardly through an oxidation zone as an annular-shaped relatively dense fluidized column of particles surrounding and in indirect heating exchange relationship with a major portion of said conversion zone, subjecting the particles in the ascending column thereof to oxidation while in concurrent contact with a stream of heated oxidizing gas, laterally expanding and upwardly disengaging the gaseous oxidizing products from the resulting particulated material within a confined gas separating zone surrounding an elevated portion of said conversion zone, discharging a stream of said gaseous oxidation product from the upper portion of said gas separating zone, separately discharging a stream of residual oxidized particles from a lower portion of said gas separating zone, passing the discharged particles to a cooling zone and therein passing an aqueous fluid in indirect heat exchange relationship with said particles, discharging partially cooled particles from the lower end of said cooling zone in a gravity flow, discharging resulting low temperature steam generated by said aqueous fluid from said cooling zone and passing said steam to a superheating zone, passing at least a portion of the hot gasiform oxidation products being discharged from said gas separating zone in indirect heat exchange relationship with said low temperature steam in said superheating zone, and passing resulting superheated steam from said superheating zone into the lower portion of said elongated conversion zone and into contact therein with said carbonaceous material.

4. The process of claim 3 further characterized in that the partially cooled residual solid material from said cooling zone is passed in gravity flow to a final cooling zone, an oxygen-containing gaseous stream is passed upwardly through said descending stream of residual solid material in direct countercurrent contact therewith, resulting substantially cooled solid material is discharged from the lower portion of said final cooling zone, and resulting preheated oxidizing gas is discharged from the upper portion of said final cooling zone and is passed to the lower portion of said combustion zone whereby to provide at least a portion of the heated oxidizing gas passing countercurrently upwardly with the solid particles therein.

5. A unitary apparatus for contacting subdivided solid particles in a fluidized state, which comprises in combination, a vertical open-ended tubular inner contacting chamber, an upper separating chamber of larger cross-sectional area than and connecting with and extending above said tubular chamber, an outer vertical tubular chamber concentric around said inner chamber and providing an annular particle contacting section, a lower separating chamber of larger cross-sectional area than said outer chamber connecting with the top of said outer chamber and with the lower portion of said upper enlarged separating chamber and surrounding the upper portion of said inner tubular chamber, vapor outlet means from the upper portion of each of said separating chambers, a particle inlet to said upper separating chamber, a particle outlet from said lower separating chamber, fluid inlet means connecting to the lower end of said inner tubular chamber, and fluid distributing inlet means communicating with the lower portion of said annular contacting section, a particle passageway from the lower end of said inner tubular chamber to the lower end of said outer tubular chamber, whereby particles reverse their direction of flow and are passed upwardly through said annular contacting section, and flow control means in said passageway.

6. The apparatus of claim 5 further characterized in that the open lower end of said inner tubular chamber is spaced a short distance above a lower confined end of said outer tubular chamber and provides said particle passageway, said fluid inlet means to the lower end of said inner tubular chamber projects upwardly through the lower confined end of said outer tubular chamber into the open lower end of said inner chamber, and said fluid distributing inlet means to the lower portion of said annular contacting section circumscribes the inside wall of the lower end of said outer tubular chamber and has gas outlet orifices projecting upwardly into said annular particle contacting section, whereby to aid in the upward flow of subdivided particles from said particle passageway.

7. The apparatus of claim 5 further characterized in that a particle outlet conduit extends downwardly from the lower open end of said inner tubular chamber and the lower end of said outer tubular chamber connects with the exterior of said outlet conduit in an expansible movable connection, a particle riser conduit connects between the lower end of said particle outlet conduit and with the lower end of said outer tubular chamber, flow control means is positioned in the lower portion of said particle outlet conduit, said fluid inlet means to the lower end of said tubular chamber communicates with the latter around said particle outlet conduit, and said fluid inlet means to the lower portion of said annular contacting section connects with the lower end of said particle riser conduit.

8. A contacting apparatus comprising a separating chamber having particle inlet means, a vertical tubular contacting chamber depending from and of smaller cross-sectional area than said separating chamber, means for introducing fluid to the lower portion of said contacting chamber, a second separating chamber depending from the first-mentioned separating chamber and surrounding the upper portion of said contacting chamber, means for removing particles from said second separating chamber, a second vertical contacting chamber depending from and of smaller cross-sectional area than said second separating chamber and surrounding and spaced from the remaining portion of the first-mentioned contacting chamber, means for introducing fluid to the lower portion of said second contacting chamber, means for passing particles from the lower end of said first-mentioned contacting chamber into the lower portion of said second contacting chamber to pass upwardly through the latter to said second separating chamber, and means for removing fluid from each of said separating chambers.

References Cited in the file of this patent
UNITED STATES PATENTS

| | | |
|---|---|---|
| 1,704,956 | Trumble | Mar. 12, 1929 |
| 2,367,281 | Johnson | Jan. 16, 1945 |
| 2,433,726 | Angell | Dec. 30, 1947 |
| 2,457,232 | Hengstebeck | Dec. 28, 1948 |
| 2,488,028 | Scheineman | Nov. 15, 1949 |
| 2,488,033 | Johnson | Nov. 15, 1949 |
| 2,511,652 | Shand | June 13, 1950 |
| 2,515,155 | Munday | July 11, 1950 |
| 2,543,884 | Weikart | Mar. 6, 1951 |
| 2,544,843 | Leffer | Mar. 13, 1951 |
| 2,560,767 | Huff | July 17, 1951 |
| 2,606,144 | Leffer | Aug. 5, 1952 |
| 2,615,796 | Peet | Oct. 28, 1952 |